United States Patent [19]
Andorf et al.

[11] 3,981,528
[45] Sept. 21, 1976

[54] ROBOT FINGER

[75] Inventors: Paul Andorf, Wettstetten; Dietmar Franz, Lampertheim; Alfred Lieb, Dossenheim; Gerd Upper, Gorsheimertal, all of Germany; Walter Guttropf, Winisch, Switzerland

[73] Assignee: Firma Carl Freudenberg, Weinheim, Germany

[22] Filed: May 19, 1975

[21] Appl. No.: 579,113

[30] Foreign Application Priority Data

May 30, 1974 Germany.............................. 2426086

[52] U.S. Cl.................................. 294/99 R; 3/1.2; 294/86 R
[51] Int. Cl.²...................... B25J 15/00; B66C 1/46
[58] Field of Search................. 294/63 A, 86 R, 88, 294/93, 99 R, 106; 3/1.2, 12, 12.7; 46/126; 214/1 CM

[56] References Cited
UNITED STATES PATENTS

| | | |
|---|---|---|
| 2,545,452 | 3/1951 | Fletcher.................................. 3/12.7 |
| 2,545,947 | 3/1951 | Felip et al............................ 3/12.7 X |
| 2,589,101 | 3/1952 | Leguillon et al........... 294/63 A UX |
| 2,733,545 | 2/1956 | Guadagna............................. 46/126 |
| 3,090,049 | 5/1963 | Lanteigne............................. 3/1.2 X |
| 3,343,864 | 9/1967 | Baer................................... 294/99 R |
| 3,601,442 | 8/1971 | Orndorff........................... 294/99 R |
| 3,640,564 | 2/1972 | Kuster................................ 294/99 R |
| 3,694,021 | 9/1972 | Mullen................................. 3/1.2 X |
| 3,713,685 | 1/1973 | Ewing ............................. 294/99 R |

Primary Examiner—Johnny D. Cherry
Attorney, Agent, or Firm—Burgess, Dinklage & Sprung

[57] ABSTRACT

A robot finger comprising a substantially enclosed, hollow elongated body, which body has integral therewith and running lengthwise exteriorly thereof a gripping pad, said hollow body being deformable by fluid pressure in the direction of said gripping pad, said gripping pad being nondeformable in the direction of said body by said fluid pressure, said elongated body having a fluid injection inlet in a wall thereof.

13 Claims, 12 Drawing Figures

ROBOT FINGER

BACKGROUND OF THE INVENTION

1. Field of the Invention

This invention relates to a robot finger, especially a robot finger of a hollow bellows-like body which, upon introduction of a fluid pressure, e.g., gas under pressure, within the interior thereof can be deformed in only one direction towards a gripping pad disposed lengthwise along the length thereof so that the movement of the hollow body upon an increase in pressure resembles the movement of a human finger. This invention particularly relates to a robot finger which will respond to fluid pressures within the interior thereof by accommodating any reactive force which may act upon the finger. This invention is particularly directed to a robot finger having a gripping pad which is restrained from movement toward the hollow body by the use of a stiffening and/or support member so as to make the assembly resistant to forces upon which the robot finger may act.

2. Discussion of the Prior Art

Robot fingers have heretofore been proposed especially for use with automatons serving for the manipulation of parts. These robot fingers are often part of a robot hand which performs gripping functions. These gripping functions are provided by a robot finger and/or robot hand and serve to move materials and apparatus in accordance with pre-programmed instructions. Often, the robot fingers are responsive to fluid pressures arising within the fingers. The movements involved in grasping with a human hand can be simulated with a robot hand mechanically only, heretofore, by highly complex and troublesome mechanisms involving a large number of articulated parts.

On account of the articulations which are needed whose manufacture requires great precision, systems of this kind additionally require constant maintenance and are subjected to a great deal of wear. Furthermore, mechanical grippers as a rule are not sufficiently versatile as they have to be especially constructed to fit the geometry and dimensions of the material on which they are to act. Accordingly, a considerable expenditure of time is required for the conversion of the manipulating robots equipped in this manner so that they are adaptable to a different material to be manipulated.

The adaptability of the human hand to the geometry and measurements of the parts to be manipulated and especially the human hand's peculiar adaption of force to the kind of material being manipulated are goals which have not thus far been achieved in a satisfactory manner.

Thus, it has been discovered that gripping means which are intended to simulate the action of a human finger are not adequate. In U.S. Pat. No. 3,343,864 there is disclosed a gripping means in the nature of a robot finger. The gripping means according to this patent is, unfortunately, utterly flabby in the loading direction in the unpressurized state and is only slightly stiffened by the application of fluid pressure. As a result of this flabby construction, an excess pressure of more than 4.7 bars must be applied within the robot finger before the gripping means exercises any measurable force at all upon the object to be gripped. If one considers that the overpressure in a compressed-air network normally amounts to 5–6 bars, such gripping means cannot be used due to its inadequate holding power.

Therefore, it becomes desirable to provide an improved robot finger which did not require an excess amount of pressure therewithin which was not in a flabby condition and could act upon a material to be manipulated without the use of excess pressure. It became particularly desirable to provide such a robot finger which would manipulate objects through the use of fluidized pressure where the fluid pressure did not exceed about 6 bars. Particularly, it became desirable to provide a robot finger which could not be deformed away from the article to be gripped and which would provide a positively acting force against the object to be gripped upon the introduction of fluid pressure within the robot finger. These and other long-felt desiderata in the art are answered in accordance with the robot finger of this invention described below.

SUMMARY OF THE INVENTION

In accordance with the present invention, there is provided a robot finger comprising a substantially enclosed hollow elongated body, which body has integral therewith and running lengthwise thereof a gripping pad, said body being deformable by fluid pressure in the direction of the gripping pad, the gripping pad being non-deformable in the direction of the body by fluid pressure, said elongated body having a fluid injection inlet in a wall thereof.

The problems of robot fingers of the prior art are solved, in accordance with this invention, by providing a robot finger which more nearly approaches the manner by which the human hand and human fingers act. The robot finger of the present invention is capable of grasping objects of different sizes and different shapes independently of their precise geometry and independent of the measurements thereof. Moreover, the robot finger of the present invention does not require the use of pressures on the order of 5 to 6 bars and can be actuated at pressures of below 0.1 bars and generally is actuated at pressures between 0.1 and 2.5 bars, depending upon the material of construction and the object to be manipulated. The robot finger of the present invention is readily susceptible to a programmed application of force and thus, can be used for exerting both a gentle and a firm grip. For instance, it can be used to exert a gentle grip such as involved in the grasping of an egg, while it can also be used to firmly grip a piece of steel. The robot finger of the invention can also be constructed of fire-resistant or heat-resistant materials and can be used to manipulate hot objects or the like of varying sizes, weight and shape. The robot finger of the invention is, therefore, operable in a manner analogous to the human finger and is responsive to moderate fluid pressures within its hollow body. Moreover, it is not characterized by any flabby construction, having a relatively rigid but deformable gripping pad on one side thereof.

The robot finger of the present invention is characterized by having a gripping pad which runs longitudinally along an exterior wall of the enclosed hollow elongated body of the robot finger. This gripping pad is movable only in the direction of manipulation and is not movable toward the hollow body itself. Conversely, the hollow body is movable in the direction of the gripping pad but, in accordance with the invention, is not movable in a direction opposite thereto. Thus, when pressure is applied by the introduction of fluid within the hollow body, the robot finger will bend in the direction of the gripping pad and thus in the direction of the article to be manipulated. A slight amount of pressure will bend the robot finger slightly so that only moderate force is exerted upon the object to be manipulated. By increasing the pressure more positive gripping with greater force can be exerted upon the object to be manoeuvered.

Generally speaking, the robot finger of the present invention comprises an enclosed elongated hollow body having a bellows-like construction. The body itself is, however, composed of a material having a high resistance to flexure such that the reaction force opposing the gripping action will bend it very slightly or not at all. The high moment of resistance is achieved by providing the robot finger with a height which is at least as great as its width.

The bellows-like hollow body is closed at one end and is elongated when pressure is impeded on a portion of its circumference by an incorporated gripping pad which is integral thereto. The gripping pad is provided adjacent and integral to the hollow body such that the hollow body bends toward the side upon which the gripping pad is located upon the application of pressure within the hollow body. Preferably, a supporting means is provided to insure that the gripping pad does not become deformed towards the hollow body and all of the deformation occurs in the direction of the gripping pad. The supporting member can be located within the hollow body itself such as by providing a rod or other shaped object running along the axis thereof in facing relationship with the portion of the wall of the hollow body which carries the griping pad. This assures that by the application of pressure, the gripping pad is not deformed inwardly, and all deformation occurs in the direction of the gripping pad. The supporting means functions such that the distance between the line of action of the force of reaction and the supporting means, corresponding to the distance to be travelled by the finger, automatically adjusts itself to a minimum value corresponding to the particular radius of curvature of the finger toward the gripping pad side. The moment of reaction which tends to bend the finger back to its original position is thus reduced to a minimum. By constructing the supporting means in the form of a chain of links which can flex only toward the gripping pad side, it is assured that relatively small radii of curvature of the finger can be affected, since in that case the curvature of the finger toward the gripping pad side is not restricted by the supporting means. Stated differently, by using a chain comprising links which can be deformed only towards the gripping pad and not towards the opposite side thereof, the robot finger responds to pressure only by moving in the direction of the gripping pad and the direction of the material to be manipulated. The chain comprising the links restrains movement in the opposite direction. Preferably, as will be seen below, there is formed a cut-out at the junction of the links in which there is accommodated a spring which joins the links, the spring serving to permit deformation of the supporting members only in the direction of the gripping pad and restraining deformation in a direction opposite thereto.

Preferably, the device is provided with compression springs or the like between the individual links or members of the supporting means of the invention, which compression means assures a precise return of the robot finger when the hollow body is depressurized, i.e., when there is no overpressure within the robot finger. At the same time, the cross section of the hollow body can be selected in any desired manner for the efficient operation of the robot finger. For reasons of practical production, however, round, triangular or quadrilateral cross sections are preferred.

The robot finger of the present invention can be constructed of any suitable material, especially metal and plastic materials. When plastic materials are employed, those plastics which are elastomeric are particularly preferred. Polyurethane has proven to be especially suitable on account of its mechanical strength and its high chemical resistance. Other plastic materials, especially thermoplastics, can be employed. In certain instances, it is desired that those plastics having a high melting point be employed where the robot finger is to be employed in the movement of materials at elevated temperature.

The gripping power conferred by friction can be increased through particular embodiments on the gripping pad. Thus, the gripping pad itself can be embossed or contain a coating with emery or the like. The gripping pad can also be provided with a layer of highly heat-resistant material such as asbestos if the robot finger is to be used to manipulate hot objects. The asbestos can be incorporated within the gripping pad itself or can be an exteriorly disposed layer.

The folds in the hollow body can be separate as they commonly are in bellows, or they may also be helical. By varying the depth of the folds around the circumference from a minimum at the gripping pad to a maximum on the opposite side, a uniform distribution of tension over the circumference can be achieved. If particularly great power is required in a relatively compact construction of the robot finger, rings or ring segments matching the cross section can be inserted into the folds of the hollow body to limit the expansion of the folds, and thus the hollow body can be subjected to a higher pressure loading. If the folds of the hollow body are helical, the greater pressure loading capacity can be achieved in an especially advantageous manner by means of a coil spring laid in the folds of the hollow body.

BRIEF DESCRIPTION OF DRAWINGS

In order to more fully illustrate the nature of the invention, reference is made to the accompanying drawings in which.

DESCRIPTION OF SPECIFIC EMBODIMENTS

Figure 1:
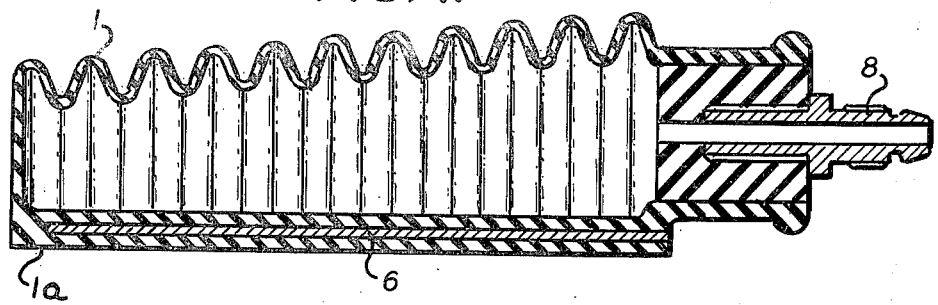
FIG. 1 is a cross-sectional side elevation of a robot finger of the invention showing a longitudinal section thereof.
Figure 2:
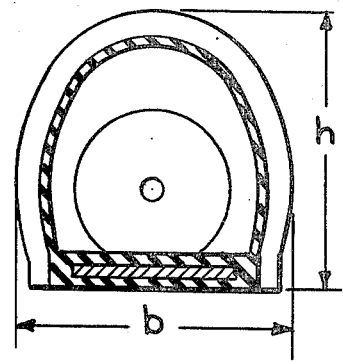
FIG. 2 is a cross-sectional view showing an end section of the robot finger of FIG. 1, the section looking in the direction of element 8.

Referring to the drawings herein, there is provided a robot finger comprising an enclosed elongated hollow body 1, a portion of which is preferably of a bellows-like construction. The hollow body is closed at both ends thereof. In one end thereof there is disposed a fluid injection inlet 8 in the form of a nipple. Along a longitudinal side of the hollow body, there is provided a gripping pad 1a, which in the embodiment of FIG. 1 is provided with a stiffening insert 6 which runs longitudinally thereof. The exterior of the gripping pad 1a can be provided with a substance which will improve contact with a material to be manipulated, e.g., it can be embossed, roughened, have an adhesive thereon or have a fabric material on the nature of Velcro which will engage other fabric material to form a locking unit. Preferably, the height $h$ of the hollow body is equal to or greater than the width $b$ thereof, as shown in FIG. 2. Upon introduction of a fluid, e.g., air under pressure, the stiffening member 6 will assist the gripping pad 1a from being deformed in the direction towards the bellows folds. Thus, the continued introduction of fluid under pressure will cause the robot finger to be deformed only the the direction of the gripping pad and toward the material to be manipulated.

Figure 3:
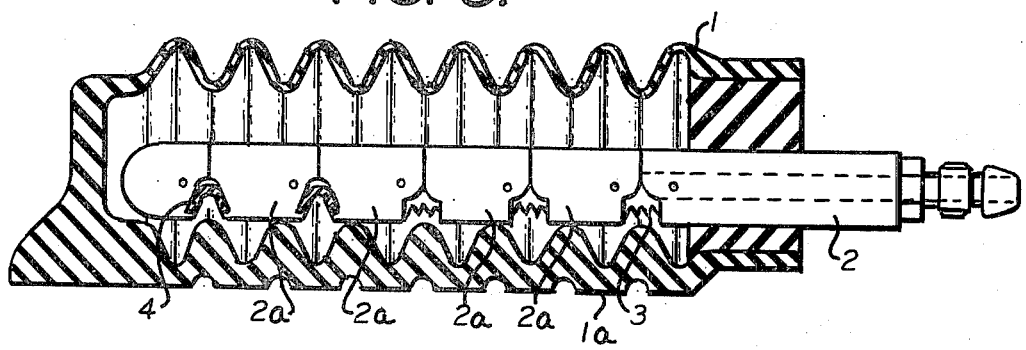
FIG. 3 is a view similar to FIG. 1 showing another embodiment of the invention provided with an internally disposed supporting member.

A preferred means for insuring that the gripping pad moves only outwardly, is depicted in FIG. 3. Therein there is shown, surrounding the nipple 8, a supporting member 2 which runs longitudinally within the hollow body. The supporting member 2 is formed of end-to-end linkages connected to one another which form a cut-out at the juncture. Within the cutout are provided coil springs 3 and/or leaf springs 4. This insures that the links 2a of the supporting member can move only in response to the spring, i.e., they can only move toward the gripping pad 1a. Movement of the links 2a in a direction opposite thereto, i.e., toward the opposed walls of the hollow body 1, is restrained owing to the presence of the springs. This stiffening member insures that the robot finger properly responds to the fluid introduced through the nipple 8. The supporting member 2 thus consists of a plurality of members 2a which are comparable to a chain and are so linked together that they can be flexed only in the direction of the side on which the gripping pad 1a is located. By the use of the springs, the supporting means 2 can be restored to its original position when the finger is in the unpressurized state.

Figure 4:
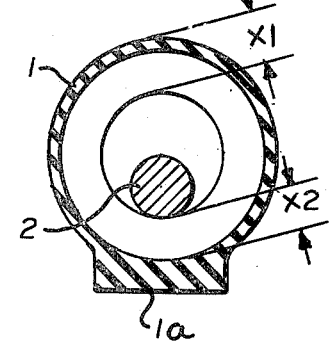
FIG. 4 is a view similar to FIG. 3 showing the disposition of an internal supporting member of the type shown in FIG. 3.

FIG. 4 shows a cross section of a typical robot finger in which the hollow body is formed of a bellows-like element. In the embodiment of FIG. 4, the gripping pad 1a is also formed of corrugated sections, and the depth of the folds of the hollow body 1 are equal to the depth of the corrugations of the portion of the wall of the robot finger on which the gripping pad bears.

Figure 5:
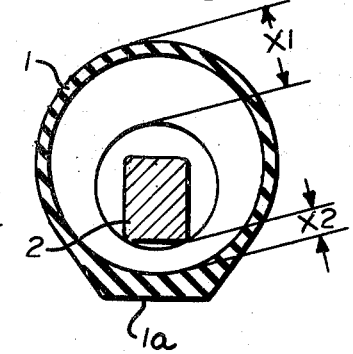
FIG. 5 is a view similar to FIG. 4 showing the use of a supporting member of different cross section disposed in a different manner within the interior hollow body of the robot finger.
Figure 8:
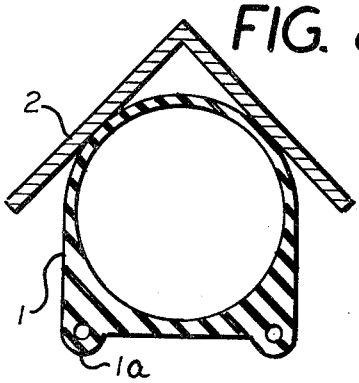
FIG. 8 is a view similar to FIG. 7 showing the use of an angle iron supporting member exterior of the hollow body of the robot finger.

FIG. 5 shows a different type of construction utilizing a supporting member 2 of rectangular, as opposed to circular, cross section. In the embodiment of FIG. 8 the depth of the folds of the corrugations of hollow body 1 are greater than the depth of the corrugations on the portion of the wall of the hollow body which carry the gripping pad.

Figure 6:
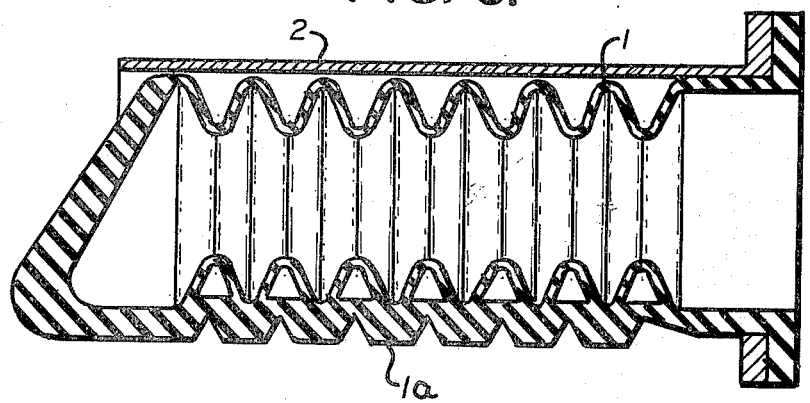
FIG. 6 is a view similar to FIGS. 1 and 3 showing a different embodiment of the invention.

In FIG. 6 there is shown a different application for supporting member 2. Here, the supporting member 2 is integral with a lip member of the robot finger and extends longitudinally exterior of the hollow body opposite the gripping pad. In this embodiment, the supporting means 2 is applied externally in a relatively rigid form and restrains movement of the hollow body in a direction opposite to that of the gripping pad 1a. The supporting means 2 can be provided in several different ways. For instance, according to FIG. 7 the supporting member 2 can be a generally arcuate member in the form of a half or three-quarter circle disposed along the walls of the hollow body which do not carry the gripping pad 1a. By the embodiment of FIG. 7 it is assured that upon the introduction of gaseous or fluid pressure within the hollow body, the same will become deformed only in the direction of the gripping pad 1a.

Figure 7:
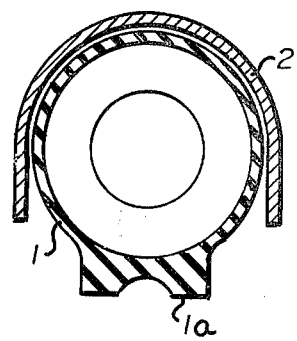
FIG. 7 is a view similar to FIGS. 2, 4 and 5 showing the disposition of an arcuately shaped supporting member exterior of the hollow body of the robot finger.

FIG. 8 is a view similar to FIG. 7 wherein an angle iron is employed so as to prevent the bellows-like hollow body from yielding under heavy stress towards the side opposite the gripping pad 1a. This is the same function provided by the supporting member 2 according to FIG. 7.

It should be noted that the gripping surface 1a can take a number of different forms as seen by a comparison of its form in FIGS. 6–9.

Figure 9:
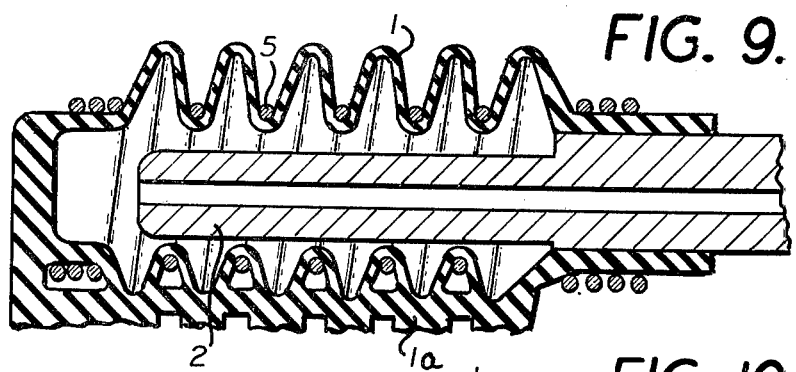
FIG. 9 is a view similar to FIG. 3 showing the disposition of an internally disposed supporting member within the interior of the hollow body, the hollow body having on its exterior walls coils of a coil spring, the coils of the coil spring being engaged within the indentations of corrugations of a wall upon which the gripping pad bears.

FIG. 9 shows a longitudinal section of the robot finger of the invention in which a coil spring 5 has been disposed thereover such that coils lie within the folds of the hollow body and engage at the nadir points of the corrugations which are on that portion of the wall of the robot finger that carries the gripping pad 1a. The supporting means 2 in this embodiment is similar to that shown in FIGS. 4 and 5, with the notable exception that it can have a central bore therein. Through this bore, there can be fed the fluid under pressure. The supporting member 2 in this instance further insures that any deformation of the robot finger upon introduction of fluid under pressure will be in the direction of gripping pad 1a. In accordance with FIG. 9 the corrugations can be enclosed by a surface which in turn carries the gripping surface 1a or the corrugations can be open. Also, the gripping surface can have teeth members as shown in FIG. 9 or a flat surface in the manner shown in FIGS. 10–12.

Figure 10:
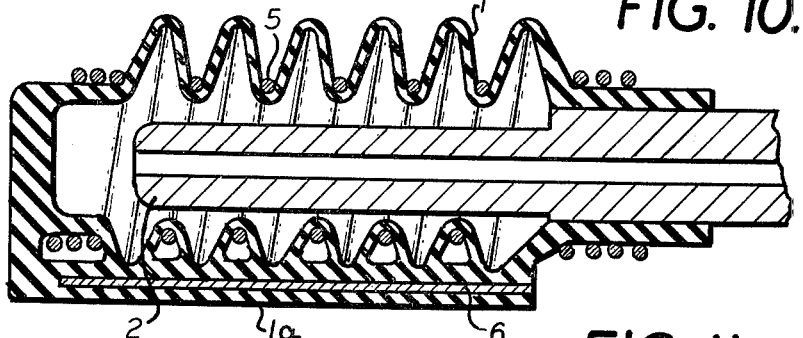
FIG. 10 is a view similar to FIG. 9 showing the use of a gripping pad having a stiffening insert 6 longitudinally disposed therewithin.

In FIG. 10 there is shown a longitudinal section through a robot finger in accordance with FIG. 7 in which there is a stiffening insert 6 of great pliancy in the direction of movement.

Figure 11:
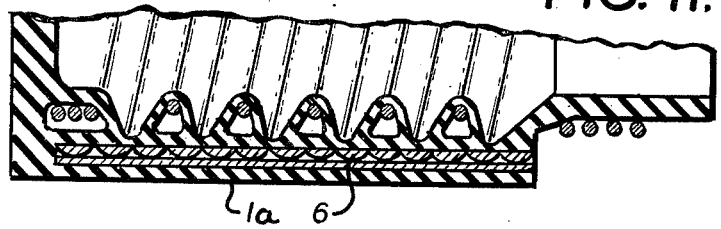
FIG. 11 is a view similar to FIG. 10 showing a supporting means which is pliable only toward the gripping pad side.

FIG. 11 shows a different construction for the stiffening insert 6 in which the supporting means is pliable only toward the gripping pad side. In the embodiment of FIG. 11, the stiffening insert 6 is in the form of corrguated members bendable toward the gripping pad 1a.

Figure 12:
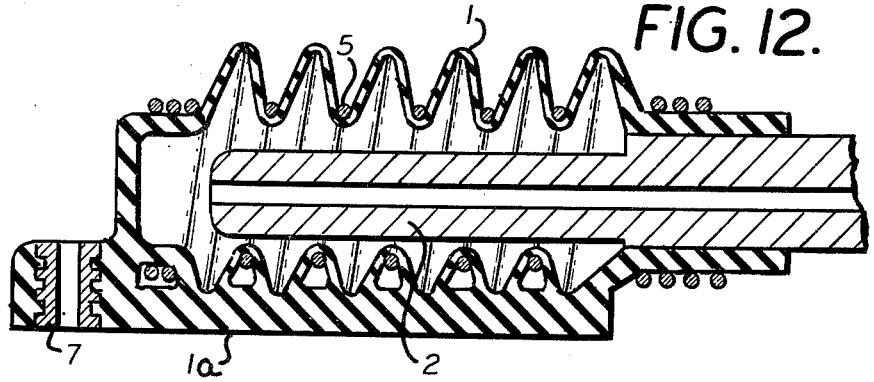
FIG. 12 is a view similar to FIGS. 10 and 11 showing a robot finger, the end of which has a lip member provided with a hole therein.

FIG. 12 shows still a different embodiment of the invention in longitudinal section whereby there is provided a supporting member 2 through which there is an annular opening which can be employed for introduction of fluid under pressure. The apparatus is provided with a coil spring which enters the folds of the bellows-like hollow body 1 on one side of the apparatus and is accommodated within the corrugations of the side of the robot finger which carries the gripping surface 1a. The ends of the coil spring 5 can be maintained on either side thereof. In accordance with the embodiment of FIG. 12, there is installed in the elongated gripping pad 1a a metal piece or lip designated by reference numeral 7. This lip is provided with an opening therethrough which serves for the mounting of hooks or other components.

What is claimed is:

1. A robot finger comprising a substantially enclosed hollow elongated body, which body has integral therewith and running lengthwise thereof a gripping pad, said gripping pad bearing on an exterior wall of said body, said body being deformable by fluid pressure in the direction of said gripping pad, said griping pad being non-deformable in the direction of said body by said fluid pressure, said elongated body having a fluid injection inlet in a wall thereof, said hollow body having a longitudinally running supporting member yieldable only in the direction toward said gripping pad, supporting member being in facing relationship with a portion of the walls of said hollow body the exterior of which carries said gripping pad, said supporting member having a circular cross section, said hollow body having therewith a bellows-like construction where the walls thereof which bear the gripping pad are corrugated, the depths of the folds of the bellows being substantially equal to the depth of the corrugations.

2. A robot finger according to claim 1 wherein said gripping pad has disposed therein a stiffening insert which, under pressure within said hollow body, is non-deformable in the direction of said hollow body.

3. A robot finger according to claim 1 wherein said supporting member comprises a series of longitudinally running juxtaposed links connected to one another by a spring on a side facing that portion of the hollow body on which the gripping pad bears.

4. A robot finger according to claim 3 wherein at the junction of the links there is a cut-out facing the portion of the walls of the hollow body which bears the gripping pad and a spring is maintained in each of said cut-outs.

5. A robot finger according to claim 1 wherein said hollow body has a height substantially equal to its width.

6. A robot finger according to claim 1 wherein said hollow body has a height greater than its width.

7. A robot finger comprising a substantially enclosed hollow elongated body having a bellows construction, which body has integral therewith and running lengthwise thereof a gripping pad, said body being deformable by fluid pressure in the direction of said gripping pad, said gripping pad being non-deformable in the direction of said body by said fluid pressure, said elongated body having a fluid injection inlet in a wall thereof, said robot finger having a supporting member maintained exteriorly of said hollow body and running longitudinally over walls thereof opposite said gripping pad, said supporting member running arcuately over said walls.

8. A robot finger comprising a substantially enclosed hollow elongated body, which body has integral therewith and runnning lengthwise thereof a gripping pad, said body being deformable by fluid pressure in the direction of said gripping pad, said gripping pad being non-deformable in the direction of said body by said fluid pressure, said elongated body having a fluid injection inlet in a wall thereof, said elongated body having a bellows-like construction and having maintained exteriorly thereof and longitudinally over walls thereof a supporting member opposite said gripping pad, said supporting member being in the form of an angle iron.

9. A robot finger comprising a substantially enclosed hollow elongated body, which body has integral therewith and running lengthwise thereof a gripping pad bearing on an external wall portion of said body, said body being deformable by fluid pressure in the direction of said gripping pad, said gripping pad being non-deformable in the direction of said body by said fluid pressure, said elongated body having a fluid injection inlet in a wall thereof, said hollow elongated body having a bellows-like construction having a supporting member maintained exteriorly of said hollow body and longitudinally over walls thereof opposite said gripping pad, the walls of said hollow body which bears the gripping pad being corrugated, wherein there is a coil spring which engages within the folds of the bellows of said hollow body and within the corrugations of the portions of the walls upon which the gripping pad bears.

10. A robot finger according to claim 9 wherein within said hollow body there is a longitudinally running supporting member which is non-deformable in a direction opposite the gripping pad and said gripping pad contains therewithin a stiffening insert.

11. A robot finger according to claim 10 wherein at one end of said robot finger opposite the fluid injection inlet there is a lip.

12. A robot finger according to claim 11 wherein said lip contains a hole therethrough.

13. A robot ringer comprising a substantially enclosed hollow elongated body, which body has integral therewith and running lengthwise thereof a gripping pad bearing on an external wall portion of said body, said body being deformable by fluid pressure in the direction of said gripping pad, said gripping pad being non-deformable in the direction of said body by said fluid pressure, said elongated body having a fluid injection inlet in a wall thereof, said hollow body having therein a longitudinally running supporting member movable only in the direction towards said gripping pad, said supporting member being in facing relationship to the portion of the walls of said body the exterior of which carries said gripping pad, said supporting member having a rectangular cross section and being maintained within said hollow body, said hollow body having a bellows-construction where the walls thereof which bear the gripping pad are corrugated, the depths of the walls of the folds of the bellows being greater than the depths of the corrugations.

* * * * *